3,845,078
1,5,9-TRIMETHYLCYCLODODECATRIENE DERIVATIVES

Seymour Lemberg, Elizabeth, N.J., assignor to International Flavors & Fragrances Inc., New York, N.Y.
Continuation-in-part of abandoned application Ser. No. 551,675, May 20, 1966. This application May 15, 1967, Ser. No. 638,429
Int. Cl. C07d 1/00
U.S. Cl. 260—348 C    9 Claims

ABSTRACT OF THE DISCLOSURE

Novel cyclic materials produced by cyclizing and/or epoxidizing trimethyl cyclododecatriene, and, optionally, converting the products to alcohols or ketones and/or hydrogenating the products to provide a lower degree of unsaturation; processes for producing such materials; and perfume and fragrance-imparting compositions containing such materials.

---

This application is a continuation-in-part of copending application Ser. No. 551,675, filed May 20, 1966, now abandoned.

BACKGROUND OF THE INVENTION

In the perfumer's art there is a considerable need for substances having a woody fragrance note which is at least moderately persistent. Especially desirable are materials which combine a woody fragrance with a camphoraceous fragrance note. Such woody, camphoraceous fragrance materials have a wide utility in the preparation of fragrance-modifying and finished perfume compositions. A limited amount of such materials is available from natural sources, but the natural materials are subject to wide variation in quality, are expensive, and are limited (and often critically short) supply.

THE INVENTION

This invention provides novel compositions and components together with novel processes and steps of processes, specific embodiments of which are described hereinafter by way of example and in accordance with which it is now preferred to practice the invention.

Briefly, the novel cyclic materials of this invention are 1,5,9-trimethyl-13-oxabicyclo[10.1.0] trideca - 4,8 - diene and hyrogenated, cyclized and reduced derivatives thereof, including 1,5,9 - trimethylcyclododeca - 5,9 - dien-2-one, and cyclized trimethylcyclododecatriene and epoxy derivatives of the cyclized trimethylcyclododecatriene. The processes of this invention broadly involve the reaction of 1,5,9 - trimethylcyclododecatriene with an epoxidizing agent and if desired a cyclizing agent, in which case either of these agents can be used. Under some conditions the treatment provides a preponderance of an epoxy derivative, and under other conditions a ketonic material is obtained as the main product. The substances thus produced can be further treated, as by hydrogenation or reduction, to produce other useful new materials. These novel cyclic materials are:

1,5,9-Cyclododecatriene-1,5,9 derivatives of the formula wherein and the dashed lines represent single or double bonds; the cyclized derivatives when is and the epoxy products of said cyclized derivatives when The novel materials disclosed herein can be incorporated into a wide variety of finished perfume compositions and components for finished perfume compositions. It has been found that the novel materials of this invention have persistent fragrances, as more fully described below, which peculiarly adapt them for incorporation into perfume compositions where a distinct woody fragrance note is required.

One of the primary materials provided by this invention is 1,5,9-trimethyl-13-oxabicyclo[10.1.0] trideca-4,8-diene (hereinafter generally referred to as "bicyclo C-12"). The bicyclo C-12 is prepared by treating 1,5,9-trimethylcyclododecatriene (hereinafter also referred to as "cyclo C-12") with an organic percarboxylic acid in the presence of an alkaline reagent. This reaction should be conducted under anhydrous conditions since any substantial amount of water is deleterious to the reaction.

Another primary material provided by carrying out process of this invention is cyclized trimethylcyclododecatriene (hereinafter also referred to as "cyclized cyclo C-12"). A cyclized bicyclo C-12 can also be obtained according to the present invention. It will be understood from the following description that the cyclized materials are useful perfume and fragrance-modifying substances and intermediates in preparing other perfume and fragrance-modifying substances.

The cyclized materials according to this invention can be obtained by treating the cyclo C-12 or the bicyclo material with a proton donor or an electron acceptor. While the reaction mechanism may not be entirely elucidated, it is presently believed that the proton donor forms an intermediate material in which one of the double bonds contains a proton or a positive charge and that such charge renders it reactive. Exemplary of such proton donor materials are sulfuric acid, and various phosphoric acids including dilute orthophosphoric acid, concentrated phosphoric acid, and higher phosphoric acids such as pyro- and polyphosphoric acids. A preferred cyclizing agent is 85% phosphoric acid. Boron trifluoride is also a useful cyclizing agent. Unless otherwise indicated, all parts, proportions, percentages, and ratios herein are by weight.

The present invention is further illustrated in the accompanying drawings, wherein FIGS. 1 and 2 are, respectively, infrared absorption and NMR spectra of cyclized bicyclo C-12;

Cyclo C-12 is generally available at purities of 90% and upwards, and it can be used in this form. It is generally preferred however in the practice of this invention to refine the material to substantially 100% purity. Such purification is readily accomplished by fractional distillation.

An epoxidizing agent used in carrying out the process of this invention is an organic percarboxylic acid. Generally, any organic aliphatic or aromatic percarbboxylic acid having from 1 to about 10 carbon atoms can be successfully used in this invention. Aromatic percarboxylic acids such as perbenzoic, perphthalic, and chloroperbenzoic acids, and aliphatic percarboxylic acids such as performic acid are desirably used in the process of this invention. A preferred organic carboxylic acid for use herein is peracetic acid. It is generally preferred to use substantially one mole of the organic peracid for each mole of the cyclo C–12 to be treated.

In order to secure good yields of bicyclo C–12 an alkaline reagent should be present. While the reaction mixture of this invention should be substantially anhydrous, the term "alkaline reagent" as used herein means a material which would make the reaction mixture alkaline in aqueous media. A wide variety of salts of a strong base and a weaker acid can be used for this purpose. A preferred pH-controlling material is anhydrous sodium acetate.

The treatment of cyclo C–12 with epoxidizing agent is preferably carried out in an inert reaction vehicle. Such a reaction vehicle is desirably a solvent for the components of the reaction mixture or a liquid in which the components of the reaction mixture readily disperse. The vehicle serves to insure more intimate contact of the ingredients of the reaction mixture and to assist in temperature control, as well as to moderate the reaction. Suitable vehicles for use in the process include chlorinated hydrocarbons such as chloroform and carbon tetrachloride, aromatic materials such as benzene and toluene, and oxygen-containing solvents, such as diethylether. A preferred vehicle in the practice of this aspect of the invention is methylene chloride.

The epoxidation can be carried out over a fairly wide range of temperatures, depending upon the particular concentration of reactants, the size of the reaction vessel and other equipment available, and the like. At too low a temperature, the reaction requires an inordinately long period of time, while at too high a temperature the reaction becomes unduly rapid. In fact, at unduly high temperatures the reaction rate may become so vigorous as to be explosive. Accordingly, it is desirable to carry out the epoxidation reaction at temperatures in the range of from about —15° C. to about 30° C.

The time required for the epoxidation reaction varies inversely with the temperature and should be sufficient to provide a high completeness for the reaction. The reaction is conveniently controlled by introducing the cyclo C–12 and vehicle, if any, into a reaction vessel fitted with mixing means and heat transfer means and then slowly adding the requisite amount of epoxidation agent. The reaction mass can, if necessary, be maintained in the desired temperature range after all the agent is added until the reaction is complete.

Generally, a temperature range of from about —15° to about 30° C. over a period of about 2–5 hours is required for the percarboxylic acid addition. The reaction can be carried out at sub- or superatmospheric pressure, but if a subatmospheric pressure is used it should not be so low as to cause ebullition or substantial evaporation of the vehicle or any of the reactants. The reaction is preferably carried out at atmospheric pressure. Since this reaction is sensitive to the presence of water, it should not be conducted in a very humid atmosphere, although there is no need to exclude air. If desired, the reaction can be carried out under an inert atmosphere such as nitrogen, argon, and the like.

When the epoxidation reaction is substantially complete, it is terminated by the addition of water. The water is mixed into the organic material and is subsequently removed therefrom, being most readily removed by decantation of the organic layer from the aqueous layer.

The reaction product mixture can be further purified by the addition of a reducing agent to inactivate any traces of the epoxidation agent. For example, the organic layer can be treated with an aqueous solution of a reagent such as ferrous ammonium sulfate. The reaction product is generally further deacidified, for example with aqueous sodium bicarbonate solution, to remove all traces of acidic materials. The bicyclo C–12 is obtained from the reaction mixture by distillation after the washing and decantation of the organic layer.

The reaction product is a clear liquid with an intense and persistent woody-amber odor. It has a boiling point of 106–108° C. at 1.0 mm. Hg and an $n_D^{20}$ of 1.5046–1.5053. The IR, NMR, and mass spectra are consistent with several possible geometric isomers, including one having the structure:

Bicyclo C–12 derivatives are produced by treatment with hydrogen in the presence of a hydrogenation catalyst such as nickel, palladium, platinum, rhodium, or salts thereof. Preferred hydrogenation catalysts are palladium and its salts such as palladium chloride.

Where the dihydro bicyclo C–12 derivative is desired, the material is treated with one mole of hydrogen. The tetrahydro material can be obtained by utilizing two or more moles of hydrogen. It will be understood that mixtures of the bicyclo C–12 and dihydro material or of the dihydro and tetrahydro derivatives can be made by varying the quantity of hydrogen up to two moles. The hydrogenation can be carried out at pressures from atmospheric up to about 200 p.s.i.g. Superatomspheric pressures on the order of 100 p.s.i.g. are preferred because the reaction proceeds more rapidly and completely under such pressure conditions.

To carry out the hydrogenation, the catalyst can be directly introduced into the bicyclo C–12 and the mixture can then be treated with hydrogen. It is preferred that an inert reaction vehicle be admixed with the bicyclo C–12 in the hydrogenation process. For example, lower alkanols are desirable reaction vehicles, and ethanol is a preferred reaction vehicle.

The temperature used can range from room temperature to over 100° C., and is preferably maintained at 80–100° C. At low temperatures the hydrogen is only slowly absorbed, whereas at temperatures greatly in excess of 100° C. the reaction proceeds so rapidly as to present problems in controlling it.

The hydrogenated bicyclo C–12 is recovered from the reaction mixture by filtration to remove the catalyst solids and by a subsequent distillation to remove any reaction vehicle which has been used. It is preferred that such distillation to remove the vehicle be carried out under a vacuum. If desired, the hydrogenated material can be further purified by fractional distillation.

Hydrogenation of the bicyclo C–12 with one mole of hydrogen produces dihydro compounds including 1,5,9-trimetyl-13-oxabicyclo[10.1.0]-tridec-4-ene. This is a colorless oil having a woody-amber odor, a boiling point of 72° C. at 0.2 mm. Hg, and an $n_D^{20}$ of 1.5021. Spectral tests indicate a molecular weight of 222 and that the structure of the compound is as follows:

When two moles of hydrogen are used in the hydrogenation, 1,5,9-trimethyl-13-oxabicyclo[10.1.0]-tridecane is obtained. The material is a colorless oil with a woody-amber fragrance similar to that of the bicyclo C–12, a boiling point of 72° C. at 0.2 mm. Hg and an $n_D^{20}$ of 1.4975. Mass spectroscopy which indicates a molecular weight of 224 supports the described structure:

The cyclization of the cyclo C–12 or bicyclo C–12 is preferably carried out in the presence of a reaction vehicle, desirably one in which the reactants are soluble or readily dispersed. Examples of desirable solvents are aromatic solvents and substituted aromatic solvents such as benzene, toluene, xylene, and chlorobenzene, aliphatic solvents such as hexane, and chlorinated aliphatic hydrocarbons. Benzene and toluene are preferred vehicles.

The cyclization of cyclo C–12 is carried out by admixing in any order the vehicle, the cyclizing agent, and the cyclo C–12. The cyclization temperature can range from room temperature or somewhat below, e.g. 25° C., up to 300° C., although upper temperatures of 200° C. or below are desirable in many instances. The lower temperatures result in very long reaction times, so that it is preferable to use higher temperatures, depending upon the cyclizing agent and the reaction vehicle used. Temperatures at the upper end of the range may cause side reactions to proceed more rapidly than the desired cyclization and thus lower the yield.

A further factor determining the cyclization temperature is the boiling or melting point of the reaction vehicle. The reaction can be carried out at sub- or superatmospheric temperatures, and atomspheric pressure is usually the most convenient and desirable. Accordingly, it is generally preferred to carry out the cyclization reaction at temperatures at or below the boiling point of the vehicle, and use of a vehicle at reflux temperatures provides ready temperature control. Thus, for cyclizing cyclo C–12, temperatures of 25° to 300° C. can be used, although an upper temperature limit of 200° is desirable. This cyclization reaction is most usefully carried out at temperatures of 100° to 130° C. At these temperatures the reaction can be carried out for from about 15 minutes to about ten hours, the actual time depending upon the cyclizing agent, vehicle, pressure, and type of cyclized product desired.

To cyclize bicyclo C–12 a mixture of vehicles and cyclizing agent is prepared, and the bicyclo C–12 is then added over a period of from about 2 to about 8 hours while the temperature is desirably maintained in the range of from 30° C. to 40° C. A preferred temperature range for carrying out the cyclization reaction is from about 32–35° C. The time required varies inversely with temperature. If the addition is carried out too rapidly and the temperature is very high, some breakdown of the bicyclo C–12 may occur, but very low reaction temperatures require inordinately long times to complete the reaction. Accordingly, it is preferred to perform this reaction under conditions such that 4–8 hours are required substantially to complete the reaction.

After the cyclization reaction is complete water is added to wash the organic material which is then decanted. The reaction product can be subjected to one or more further washings and is then treated with an alkalizing agent, such as a strong alkali like sodium hydroxide or the salt of a strong base and a weak acid like sodium bicarbonate, to remove all further traces of acidity.

After the cyclization reaction is complete and the reaction-mixture has been neutralized and washed, the product is preferably further purified, for example, by distillation or extraction. Fractional distillation has been found to be especially satisfactory for purifying the product. When even greater purity is desirable, the product can be purified by preparative chromatographic techniques.

Cyclized cyclo C–12 produced according to this invention can further be treated with an epoxidation agent to form the epoxy derivatives. The epoxy derivatives of cyclized cyclo C–12 are prepared in substantially the same manner as is the bicyclo C–12 prepared from the cyclo C–12.

Figure 1:
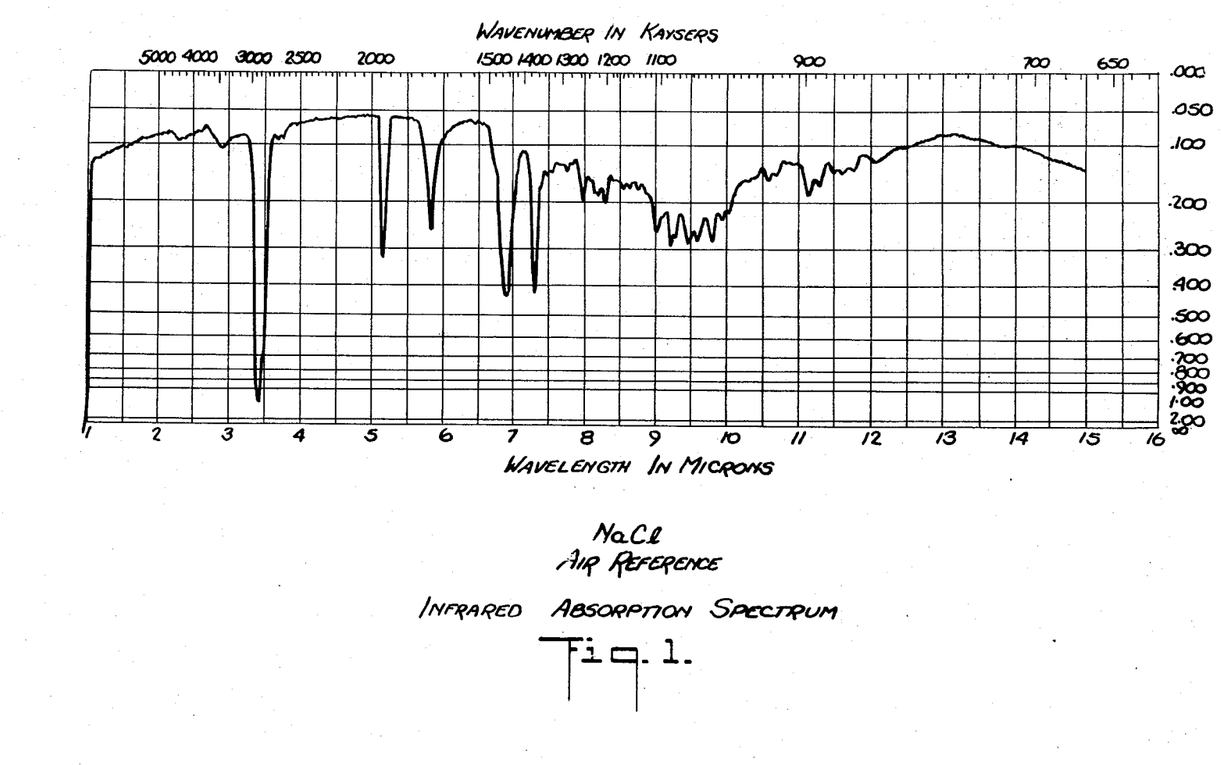
Figure 2:
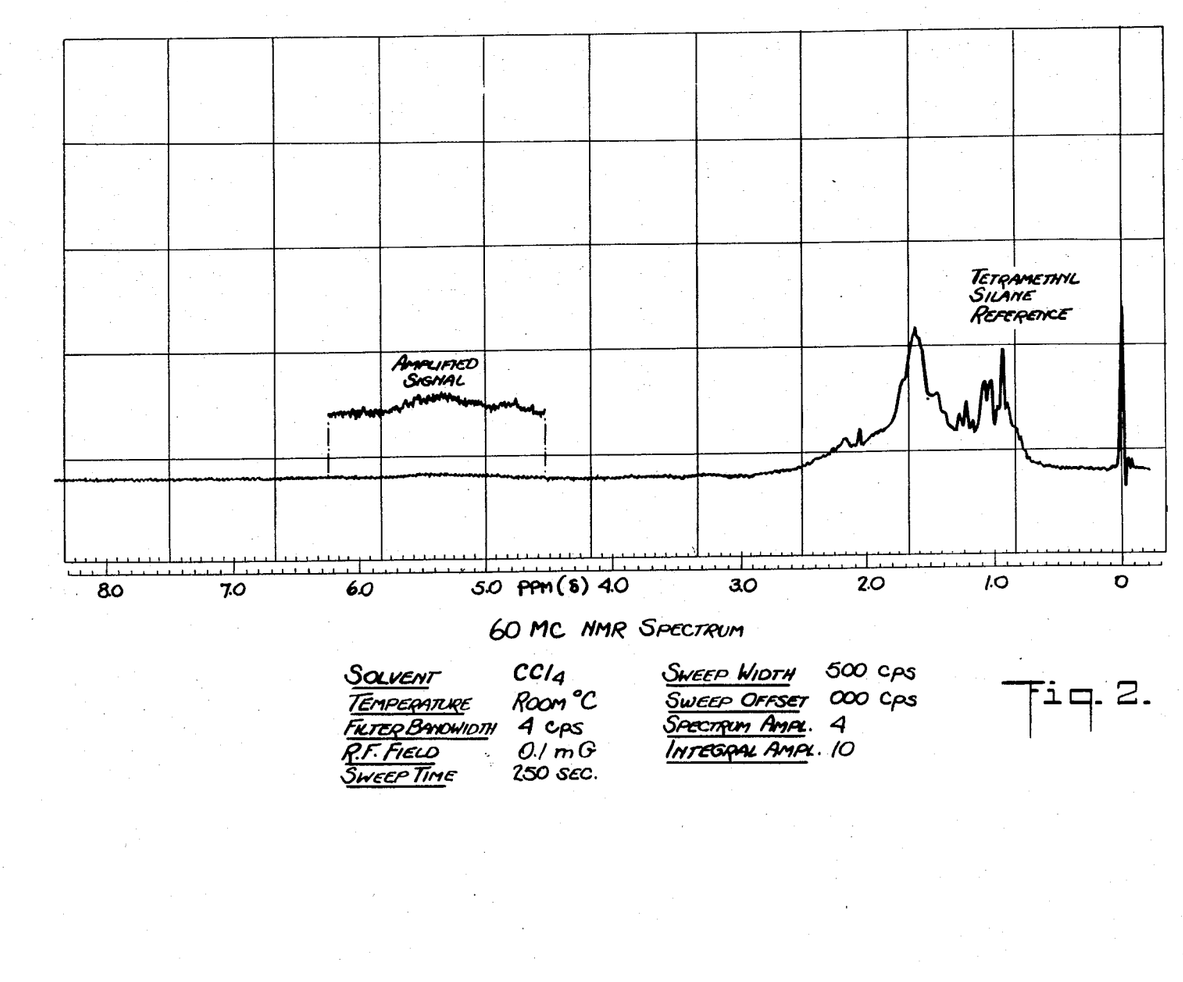

For the distilled cyclized bicyclo C–12, it has been found preferable for perfumery to utilize the cyclized material which forms a constant-boiling mixture as determined by gas-liquid chromatographic analyses. By this method cyclized 1,5,9-trimethyl - 13 - oxabicyclo[10.1.0]-trideca-4,8-diene is obtained as a clear liquid with a boiling point of 95–100° C. at 0.4 mm. Hg, an $n_D^{20}$ of 1.5040–1.5101, the infrared (IR) absorption spectrum shown in FIG. 1, and the nuclear magnetic resonance (NMR) spectrum shown in FIG. 2. This material has a pleasant woody, camphoraceous odor. In the FIG. 2 spectrum, the inflection peaking at about 5.3 p.p.m. on the chart is presented in amplified form just above the complete presentation. The IR spectrum is obtained on a Beckman spectrophotometer Model IR 4 under the indicated conditions and the NMR spectrum is obtained on a Varian Model A 60 at the indicated parameters.

Figure 3:
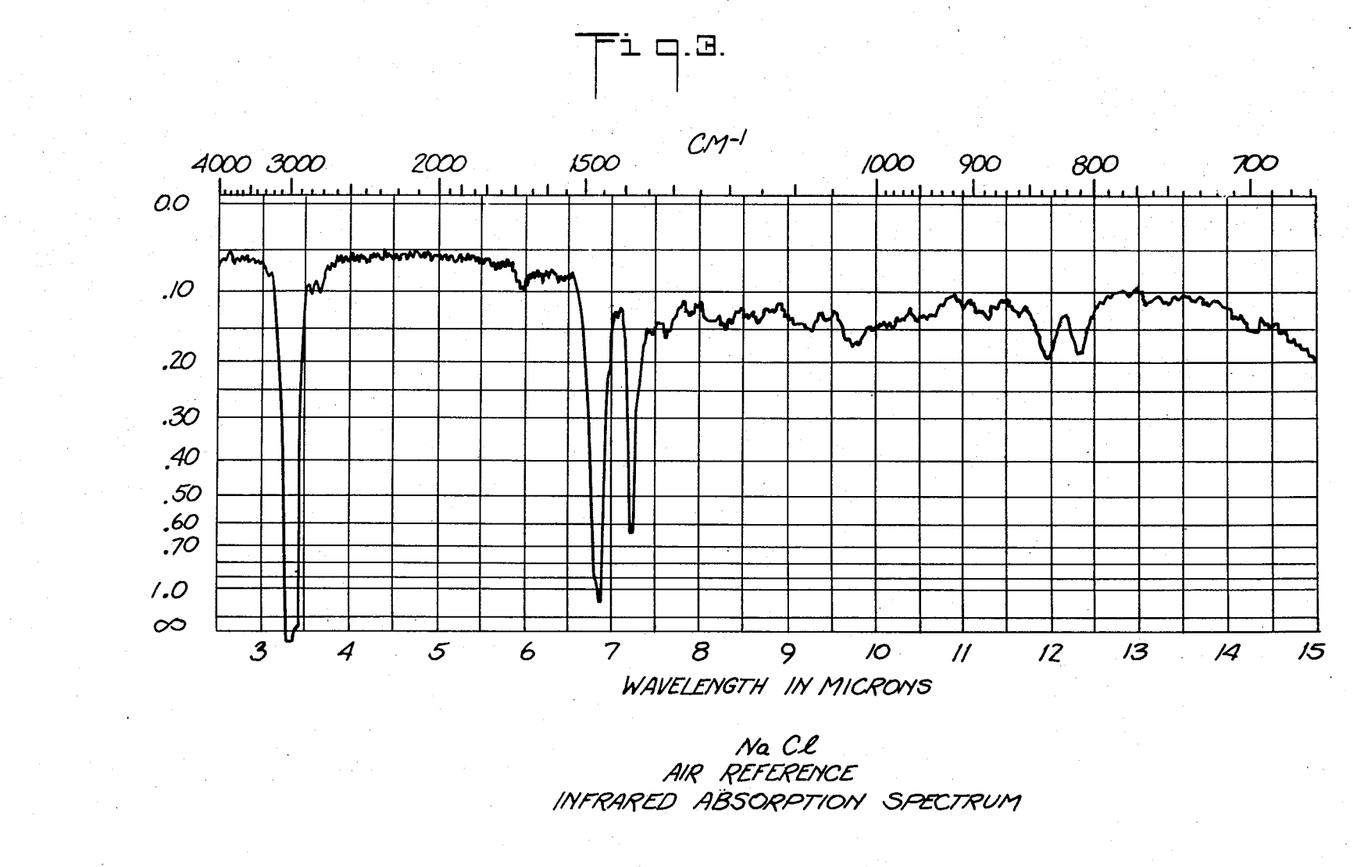
FIG. 3 is an infrared absorption spectrum of cyclized cyclo C-12.
Figure 4:
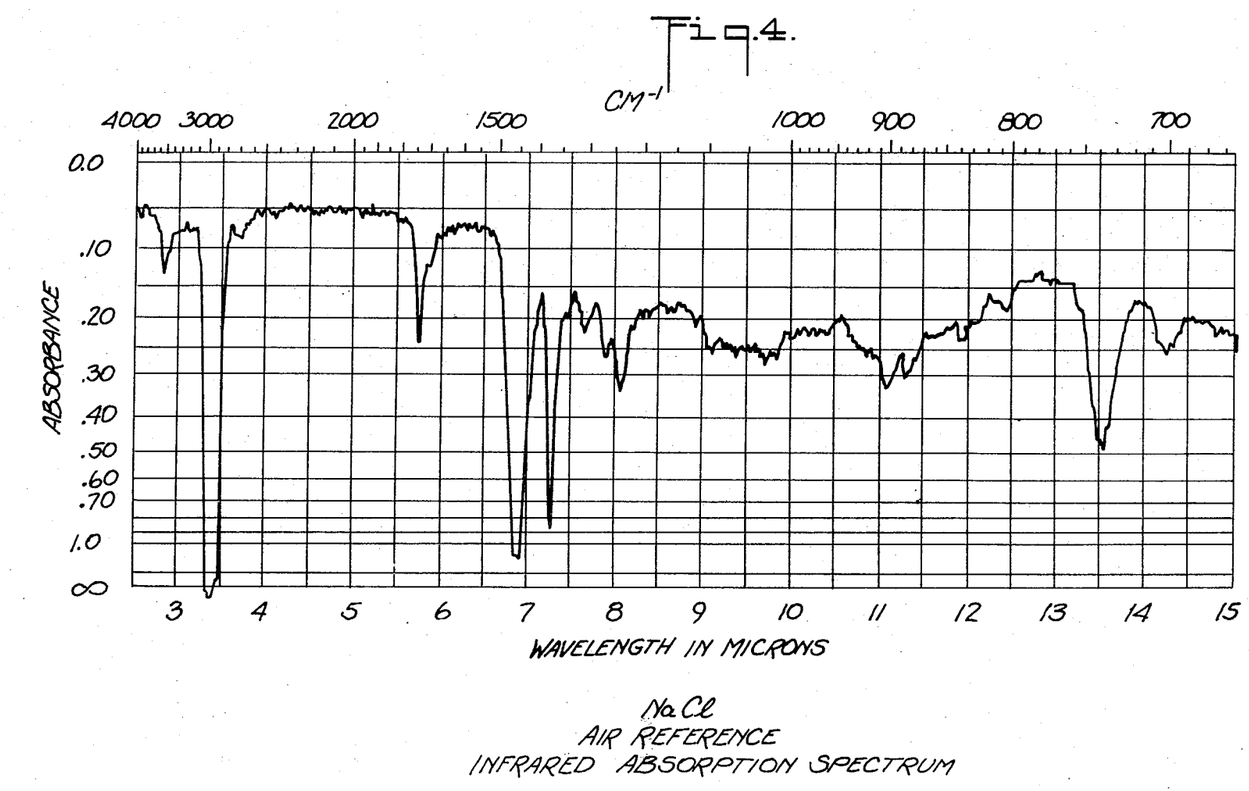
FIG. 4 is an infrared absorption spectrum of epoxy cyclized cyclo C-12.

The cyclized cyclo C–12, in a liquid having for example, fractions boiling at 106° C. to 128° C. at 1.0–1.5 mm. Hg with the lower boiling fractions showing an $n_D^{20}$ of 1.5045 and ranging up to 1.5104 for the higher boiling fractions. After further treatment to epoxidize the cyclized material, the epoxy cyclized cyclo C–12 is a liquid having fractions boiling at temperatures of 120°–134° C. at 1.6–1.3 mm. Hg. The $n_D^{20}$ ranges from 1.4943 for lower boilers to 1.4982 for the higher boilers. The cyclized cyclo C–12 has the infrared absorption spectrum shown in FIG. 3, and the epoxy cyclized cyclo C–12 has the infrared absorption spectrum shown in FIG. 4. The IR spectra of FIGS. 3 and 4 are obtained under the indicated conditions. The epoxy cyclized cyclo C–12 has an intense pleasant woody, camphoraceous odor which is persistent. It is noted that the combination of cyclized bicyclo C–12 and epoxy cyclized cyclo C–12 gives a fragrance material having an intense initial odor note with excellent persistence.

The alcohol derivative of bicyclo C–12 is prepared by treating the bicyclo material with a reducing agent to form the alcohol. Water and oxygen should be excluded from this reaction, and it is preferred that the reaction be conducted in an inert atmosphere, such as nitrogen, argon, and the like. It is especially preferred that the reaction be carried out under a blanket of dry nitrogen.

The desirable reducing agent for use in preparation of the alcohol is lithium aluminum hydride. The reaction is preferably carried out in the presence of a vehicle which is a solvent for the reducing agent. When lithium aluminum hydride is used as the reducing agent, materials such as "Diglyme" (diethyleneglycol dimethyl ether) can be used as solvents, and tetrahydrofuran is particularly suited to the process. Tetrahydrofuran is also valuable in controlling the reaction because the mass can be held at the reflux temperature of the solvent.

The reduction is desirably carried out at temperatures of from 60° to 200° C. The solvents for the reducing agents generally determine the upper temperatures at which the reaction can be carried out. At temperatures below the desired range the reduction is unduly slow. Superatmospheric pressures can be used to raise the ebullition temperature of the solvent or dispersing agent and permit operation at slightly higher temperatures. The time required for the reduction desirably ranges from two to ten hours.

After the alcohol has been formed by the reduction, water is slowly added to the reaction mass and the alkaline materials are then neutralized by the addition of a suitable acid such as acetic acid. The alcohol formed is removed from the reaction mass with a suitable solvent such as diethylether.

The mixture of geometric isomers 1,5,9-trimethylcyclododeca-4,8-dien-1-ol so prepared is a clear liquid having a boiling point of 113–118° C. at 0.1 mm. Hg and an $n_D^{20}$ of 1.5134–1.5143. This alcohol has a persistent woody, vetivert odor. One component of this mixture can be represented by the structural formula:

The ketone isomer mixture of this invention can be prepared by a reaction similar to that used to form the epoxide, except that the alkalizing or pH-controlling agent is omitted from the percarboxylic acid. The same times, temperatures, pressures, and inert vehicles are used for the ketone production as are set forth above in connection with the bicyclo C–12. The ketonic reaction product mixture is washed with water and an aqueous reducing agent to decompose any unreacted percarboxylic acid. The organic layer after washing until it is neutral to litmus is vacuum-distilled to remove any inert reaction vehicle. Treatment of the product with an alkalizing agent such as aqueous sodium bicarbonate can be used to assure removal of any residual acid.

The product is then fractionally distilled to obtain 1,5,9-trimethylcyclododeca - 5,9 - dien-2-one as a clear liquid with a boiling point of 128–131° C. at 2.6 mm. Hg and an $n_D^{20}$ of 1.5050–1.5057. The material can be represented by the structural formula:

The novel cyclododecadiene derivatives of this invention are particularly suited for use as perfume materials, as fragrance-modifying materials, and in the preparation of perfume compositions. They are very well adapted to perfumery where a woody aroma is required. The cyclized bicyclo C–12 is particularly remarkable for its persistent woody, camphoraceous odor, and the epoxy cyclized cyclo C–12 for its intense woody odor. The bicyclo C–12 and the alcohol also possess a persistent woody amber odor with camphoraceous overtones. To make a woody amber type of perfume the materials of this invention can be combined with many types of odor materials such as floral, musk, spice, aldehydic, oak-moss, oriental, and fougere. The novel materials of this invention can also be combined with customary perfume additives such as natural oils, synthetic oils, esters, aldehydes, ketones, alcohols, lactones, fixatives, solvents, dispersants, emulsifiers, surface-active agents, aerosol propellants, and the like.

It will be understood that the cyclized materials, the alcohol, and the ketone can be hydrogenated if desired to produce the dihydro or tetrahydro derivatives as described above in connection with the production of the dihydro and tetrahydro derivatives of bicyclo C–12 itself.

The following examples serve to illustrate embodiments of the invention as it is now preferred to practice it. It will be understood that these examples are illustrative and the invention is to be considered restricted thereto only as indicated in the appended claims.

EXAMPLE I

Preparation of the Bicyclo C–12

A mixture of 3 liters of anhydrous methylene chloride, 820 g. (10 moles) anhydrous sodium acetate and 1020 g. (5 moles) of 1,5,9-trimethylcyclododeca-1,5,9-triene is introduced into a reaction vessel fitted with a stirrer, thermometer, and dropping funnel. The stirred reaction mass is brought to 0° C. and maintained at that temperature during a 3-hour period while 1005 g. (5.5 moles) of 40% peracetic acid is added. The reaction mass is maintained at 0–5° C. for an additional hour.

The organic layer is then washed with 2 liters of water to stop the reaction and decanted. The organic layer is washed with an equal volume of a 5% aqueous solution of ferrous ammonium sulfate to remove any residual peracetic acid. The organic layer is then decanted, treated with a saturated aqueous solution of sodium bicarbonate and distilled to obtain 944 g. of 1,5,9-trimethyl-13-oxabicyclo[10.1.0]trideca-4,8-diene.

This material is a clear liquid with an intense woody amber odor. It has a B.P. of 106–108° C. at 1.0 mm. Hg and an $n_D^{20}$ of 1.5046–1.5033. The NMR, IR, and mass spectrographic data are entirely consistent with the described structure.

Similar results are obtained when perbenzoic, chloroperbenzoic, performic, and perphthalic acids are utilized in lieu of the peracetic acid in the foregoing procedure.

EXAMPLE II

Partial Hydrogenation of the Bicyclo C–12

A mixture of 500 g. of the bicyclo C–12 of Example I and 25 g. of palladium chloride is diluted with 500 g. of anhydrous ethanol, and one mole of hydrogen is introduced into the reaction mixture and absorbed at 100° C. and 100 p.s.i.g. The solid catalyst material is removed by filtration, and the resulting liquid is vacuum distilled to remove the ethanol.

1,5,9 - Trimethyl-13-oxabicyclo[10.1.0]trideca-4-ene in the amount of 475 g. is obtained. This colorless oil has a molecular weight of 222, a boiling point of 72° C. at 0.2 mm. Hg, and an $n_D^{20}$ of 1.5021.

EXAMPLE III

The bicyclo C–12 of Example I is hydrogenated according to the method of Example II over a 4-hour period to completely hydrogenate it. After filtration to remove the catalyst and removal of the ethanol as in Example II, fractionation yields 480 g. of 1,5,9-trimethyl-13-oxabicyclo [10.1.0]tridecane, a colorless oil having a boiling point of 72° C. at 0.2 mm. Hg and an $n_D^{20}$ of 1.4975. NMR spectroscopy shows no unsaturation, and mass spectrometry shows a molecular weight of 224.

EXAMPLE IV

Cyclized Bicyclo C–12

A mixture of 960 g. of 85% phosphoric acid and 480 g. of benzene is introduced into a flask fitted with a stirrer, reflux condenser, thermometer, and dropping funnel. The mixture is brought to a temperature of about 34° C. and is then maintained at 32–35° C. while 957 g. of the bicyclo C–12 prepared in Example I is added over a 1–2 hour time.

After six hours of continuous agitation at 32–35° C., the reaction mass is added to an equal volume of water. The organic layer is decanted and washed until it is neutral to litmus with a saturated aqueous solution of sodium bicarbonate and then distilled on a 24-inch Podbielniak column.

Approximately 750 g. of a constant boiling mixture of the cyclized material, as determined by gas-liquid chromatographic analysis, is obtained. This material has a pleasant woody, camphoraceous odor, a boiling point of 32–36° C. at 1.1 mm. Hg, an $n_D^{20}$ of 1.5040–1.5101, the infrared absorption spectrum shown in FIG. 1, and the NMR spectrum shown in FIG. 2.

EXAMPLE V

1,5,9-Trimethylcyclododeca-4,8-dien-1-ol

A mixture of 19 g. of lithium aluminum hydride and 500 ml. of tetrahydrofuran is introduced into a reaction flask fited with a stirrer, reflux condenser, and dropping funnel after the flask is purged with dry nitrogen. A mixture of 51 g. of 1,5,9-trimethyl - 13 - oxabicyclo[10.1.0] trideca-4,8-diene and 100 ml. of tetrahydrofuran is added to the flask from the dropping funnel during a 2-hour period while the mixture is maintained at a gentle reflux. The heating is then continued for an additional six hours to maintain the mixture at reflux.

The reaction mixture is then cooled to room temperature and 32 g. of water is slowly added. Thirty ml. of 52% acetic acid is then added to the water and reaction mixture, and the mixture is extracted with an equal volume of diethylether.

The diethylether is distilled off to obtain 15 g. of 1,5,9-trimethylcyclododeca-4,8-dien - 1 - ol as a clear liquid with a boiling of 113–118° C. at 0.1 mm. Hg and an $n_D^{20}$ of 1.5134–1.5143. Nuclear magnetic resonance data show that the material is a tertiary alcohol.

EXAMPLE VI

1,5,9,-Trimethylcyclododeca-5,9-dien-2-one

A mixture of 612 g. of 1,5,9-trimethylcyclododeca-1,5,9-triene and 1800 ml. of methylene chloride are introduced into a flask fitted with a stirrer, thermometer, reflux condenser, and dropping funnel. The mixture is brought to a temperature of about 0° C., and 605 g. of 40% peracetic acid is added during a 3-hour period while the mixture is maintained at 0–5° C. with stirring. The agitation is continued for three hours after completion of the peracetic acid addition.

The reaction mass is then washed with an equal volume of a 5% aqueous ferrous ammonium sulfate solution to destroy any unreacted peracetic acid. The organic layer is then washed to neutrality by test with litmus and the solvent is removed by vacuum distillation. The final product is distilled by means of a 3-foot tantalum wire column.

This produces 106 g. of 1,5,9-trimethylcyclododeca-5,9-dien-2-one as a water-white liquid having a boiling point of 128–131° C. at 2.6 mm. Hg and an $n_D^{20}$ of 1.5050–1.5057.

EXAMPLE VII

Cyclized Cyclo C–12

Into a one liter reaction flask equipped with a stirrer, thermometer, reflux condenser and heating mantle is placed 250 g. benzene, 250 g. polyphosphoric acid, and 250 g. trimethylcyclododecatriene. The mass is stirred and refluxed for eight hours. The reaction mass thereupon separates into two phases: an organic phase and an aqueous acid phase. The organic phase is decanted, and the aqueous acid phase is washed with one volume of benzene.

The benzene layer is washed with three volumes of saturated sodium chloride solution and dried over magnesium sulfate and filtered. The benzene is recovered and the product is distilled. The resulting product is a mixture of isomers having a boiling range of 106°–128° C. at 1.0–1.5 mm. Hg and an $n_D^{20}$ range of 1.5045–1.5104. The infrared spectrum of this material is as shown in FIG. 3.

EXAMPLE VIII

Epoxy Cyclized Cyclo C–12

Into a 3 liter reaction flask equipped with a stirrer, a thermometer, reflux condenser and dropping funnel are placed 1000 ml. methylene chloride ($CH_2Cl_2$), 180 g. anhydrous sodium acetate, and 238 g. cyclized cyclo C–12 produced in Example VII. The reaction mass is cooled to 0° C. and stirred for a period of three hours during which time 248 g. of 40% peracetic acid is added drop-wise.

When the addition of the peracetic acid is completed, stirring is continued for a period of three hours at a temperature range of 0° C. up to 5° C. The reaction mass is then left to stand overnight. After a period of approximately twelve hours the reaction mass is tested for peroxide content. One liter of water is added to the reaction mass, and the mass is then stirred and transferred to a separatory funnel.

The organic layer is separated and washed with one volume of aqueous sodium chloride, two volumes of 10% ferric ammonium sulfate [$FeNH_4(SO_4)_2$], two times two volumes of saturated sodium bicarbonate, and two volumes of saturated sodium chloride. The reaction mass is then dried over magnesium sulfate and filtered, and the solvent is recovered at 50° C. at 10 mm. Hg. The crude weight of the epoxidized product is 256 g.

The product is then distilled to obtain epoxy cyclized cyclo C–12 as a liquid having a boiling range of 120–134° C. at 1.6–1.3 mm. Hg and an $n_D^{20}$ range of 1.4948–1.4922. The IR spectrum is shown in FIG. 4. The material has an intense pleasant woody, camphoraceous odor.

EXAMPLE IX

Perfume Composition

A perfume composition is prepared by admixing the following ingredients in the indicated proportions:

| Ingredient: | Parts |
|---|---|
| Bergamot oil | 150 |
| Orange oil (Florida) | 75 |
| Lemon oil (California), C.P. | 15 |
| "IMGA" (Gamma methyl ionone) | 20 |
| Cyclized bicyclo C–12 prepared in Example IV | 50 |
| Eugenol, U.S.P. | 10 |
| "Lyral" (hydroxymethylpentyl cyclohexenecarboxaldehyde) | 30 |
| Styrallyl acetate | 5 |
| Ylang extra | 4 |
| Petitgrain SA | 25 |
| Patchouli dark | 5 |
| Camomile Oil, bulked | 1 |

EXAMPLE X

A second perfume composition is prepared by admixing the following ingredients in the indicated proportions:

| Ingredient: | Parts |
|---|---|
| Perfume composition prepared in Example IX | 390 |
| Alcohol of bicyclo C–12 prepared in Example V | 50 |

Each of these two perfume base compositions is then admixed with aqueous ethanol, chilled, and filtered to produce a finished cologne. The two colognes so prepared have a citrus aroma leaning toward a woody, amber, camphoraceous fragrance note.

These base compositions can also be used to scent soap or other toilet goods such as lotion, aerosol sprays, and the like. The other derivatives prepared according to this invention are similarly used, as further illustrated in the following Example.

EXAMPLE XI

The following perfume composition is prepared:

| Ingredient: | Amount (grams) |
|---|---|
| Cassia absolute | 60 |
| Methyl ionone | 60 |
| Jasmin extra | 80 |
| Neroli oil, bigarade | 60 |
| Patchouli oil | 60 |
| Vanillin | 60 |
| Violet | 60 |
| Epoxy cyclized cyclo C–12 produced in Example VIII | 60 |
| Lemon oil | 80 |
| Rose Geranium oil | 120 |
| Lavender oil, French | 120 |
| Sweet orange oil | 80 |
| Musk extract, 3 percent | 50 |
| Civet extract, 3 percent | 50 |
| | 1,000 |

The foregoing blend is evaluated and found to have a high degree of richness and persistence in its novel woody, amber-like quality.

What is claimed is:

1. A 1,5,9-Trimethylcyclododecatriene-1,5,9 derivative of the formula wherein is one or more of the dashed lines are a double bond, and the remaining dashed line or lines are single bonds: or is and the dashed lines represent double bonds.

2. 1,5,9-Trimethyl-13-oxabicyclo[10.1.0]tridec-4-en.

3. 1,5,9-Trimethyl-13-oxabicyclo [10.1.0]tridecane.

4. 1,5,9-Trimethylcyclododeca-5,9-diene-2-one.

5. A cyclized 1,5,9-trimethyl-13-oxabicyclo-[10.1.0]-trideca-4,8-diene having a boiling point of 95–100° C. at 0.5 mm. Hg, an $n_D^{20}$ of 1.5040–1.5101, the infrared absorption spectrum shown in FIG. 1 and the NMR spectrum shown in FIG. 2, the cyclization being carried out in the presence of a sulfuric acid, a phosphoric acid, or boron trifluoride cyclizing agent.

6. A cyclized 1,5,9-trimethylcyclododecatriene-1,5,9 having a boiling range of 106° to 128° C. at 1.0–1.5 mm. Hg, an $n_D^{20}$ of 1.5045–1.5104, and the infrared absorption spectrum shown in FIG. 3, the cyclization being carried out in the presence of a sulfuric acid, a phosphoric acid, or boron trifluoride cyclizing agent.

7. An epoxy cyclized 1,5,9-trimethylcyclododecatriene-1,5,9 having a boiling range of 120° to 134° C. at 1.6–1.3 mm. Hg, an $n_D^{20}$ of 1.4948–1.4922, and the infrared absorption spectrum shown in FIG. 4, the cyclization being carried out in the presence of a sulfuric acid, a phosphoric acid, or boron trifluoride cyclizing agent.

8. A process which comprises treating a material selected from the group consisting of 1,5,9-trimethylcyclododecatriene - 1,5,9 and 1,5,9-trimethyl-13-oxabicyclo-[10.1.0]-trideca-4,8-diene with a sulfuric acid, a phosphoric acid, or boron trifluoride proton donor to cyclize the material.

9. A process according to claim 8 wherein the cyclization is carried out in the presence of a reaction vehicle at a temperature of from about 25° to 300° C.

References Cited

UNITED STATES PATENTS

| | | | |
|---|---|---|---|
| 1,702,847 | 2/1929 | Ruzicka | 260—586 |
| 2,656,390 | 10/1953 | Stoll | 260—586 |
| 3,014,928 | 12/1961 | Wilke | 260—348 |
| 3,128,304 | 4/1964 | La Font | 260—487 |
| 3,235,601 | 2/1966 | Parsons | 260—586 |

OTHER REFERENCES

Emmons et al.: JACS 77: 89–92 (1955).

Fiesen et al.: Advanced Organic Chemistry (Reinhold, N.Y., 1961), p. 160.

JOHN D. RANDOLPH, Primary Examiner

C. M. S. JAISLE, Assistant Examiner

U.S. Cl. X.R.

260—586 M, 617 M; 252—522

UNITED STATES PATENT OFFICE
CERTIFICATE OF CORRECTION

PATENT NO. : 3,845,078
DATED : October 29, 1974
INVENTOR(S) : SEYMOUR LEMBERG

It is certified that error appears in the above-identified patent and that said Letters Patent are hereby corrected as shown below:

Col. 1, line 37, insert "in" between "are" and "limited.

Col. 2, line 4, "$C_b\text{-}C_a\text{-}CH_3$" should read "$C_b\text{-}C_a\text{-}CH_3$"

Col. 2, line 34, insert "the" after "out" at the end of the line.

Col. 9, Example V, line 16, correct the spelling of "fitted"

Col. 9, Example V, line 31, insert "point" between "boiling" and "of".

Col. 11, Claim 1, line 41, after "or" cancel "more" and insert --none-- in lieu thereof.

Col. 11, Claim 2, at the end of the line, "en" should read -ene.--

Col. 12, Claim 5, line 5, "0.5 mm.Hg." should read --0.4 mm.Hg.--

Signed and Sealed this twenty-third Day of September 1975

[SEAL]

Attest:

RUTH C. MASON
Attesting Officer

C. MARSHALL DANN
Commissioner of Patents and Trademarks